United States Patent
Faucher et al.

(10) Patent No.: US 8,737,354 B2
(45) Date of Patent: May 27, 2014

(54) METHOD OF DATA PATH SWITCHING DURING INTER-RADIO ACCESS TECHNOLOGY HANDOVER

(75) Inventors: David W. Faucher, Guthrie Center, IA (US); Edward Grinshpun, Freehold, NJ (US)

(73) Assignee: Alcatel Lucent, Paris (FR)

( * ) Notice: Subject to any disclaimer, the term of this patent is extended or adjusted under 35 U.S.C. 154(b) by 194 days.

(21) Appl. No.: 12/987,308

(22) Filed: Jan. 10, 2011

(65) Prior Publication Data

US 2012/0177002 A1 Jul. 12, 2012

(51) Int. Cl.
*H04W 4/00* (2009.01)

(52) U.S. Cl.
USPC ........... 370/331; 370/353; 370/354; 455/436; 455/442

(58) Field of Classification Search
USPC .......... 370/331, 353, 354; 455/436, 439, 442, 455/33.2
See application file for complete search history.

(56) References Cited

U.S. PATENT DOCUMENTS

| | | | |
|---|---|---|---|
| 2008/0267407 A1* | 10/2008 | Vanderveen | 380/277 |
| 2009/0313466 A1* | 12/2009 | Naslund et al. | 713/155 |
| 2010/0111041 A1 | 5/2010 | Lim et al. | 370/331 |
| 2010/0279684 A1* | 11/2010 | Salkintzis | 455/434 |

FOREIGN PATENT DOCUMENTS

WO  WO 2010069985 A1 * 6/2010

OTHER PUBLICATIONS

International Search Report PCT/US2011/065761 dated May 3, 2012.
Written Opinion dated May 3, 2012.
Kitatsuji Y et al: "On Handover Procedure with Data Forwarding for Reducing Buffered User Data in Base Stations", Global Telecommunications Conference, 2009. Globecom 2009. IEEE, IEEE,Piscataway, NJ, USA, Nov. 30, 2009, pp. 1-8, XP031646436, ISBN: 978-1-4244-4148-8 p. 2, col. 2, line 29-p. 3, col. 1, line 38 p. 3, col. 2, line 24-p. 4, col. 2, line 14 figures 3,4.
Catt: "End Marker support during Intra-EUTRAN handover procedure ", 3GPP Draft; S2-084883, 3$^{rd}$ Generation Partnership Project (3GPP), Mobile Competence Centre; 650, Route Des Lucioles; F-06921 Sophia-Antipolis Cedex; France, vol. SA WG2, No. Montreal; 20080618, Jun. 18, 2008, XP050266971, [retrieved on Jun. 18, 2008] Chapter 1.

* cited by examiner

*Primary Examiner* — Kibrom T Hailu
*Assistant Examiner* — Zewdu A Beyen
(74) *Attorney, Agent, or Firm* — Davidson & Sheehan LLP

(57) ABSTRACT

The present invention provides a method of data path switching. Embodiments of the method include transmitting a packet from a node in a communication system during hand off of a mobile node from a source access network to a target access network. The packet includes an end marker that indicates that the packet is the last packet to be transmitted during the hand off over a source link between the mobile node and an anchor node via the source access network during the hand off. Embodiments of the method also include switching, at the node, a transmission data path from the source link to a target link between the mobile node and the anchor node via the target access network following transmission of the packet including the end marker.

20 Claims, 5 Drawing Sheets

METHOD OF DATA PATH SWITCHING DURING INTER-RADIO ACCESS TECHNOLOGY HANDOVER

BACKGROUND OF THE INVENTION

1. Field of the Invention

This invention relates generally to communication systems, and, more particularly, to wireless communication systems.

2. Description of the Related Art

A conventional communication system uses one or more access nodes to provide network connectivity to one or more mobile nodes. The access nodes may be referred to as access points, access networks, base stations, base station routers, cells, femtocells, and the like. For example, in a cellular communication system that operates according to Universal Mobile Telecommunication Services (UMTS) standards, one or more nodes may be used to provide wireless network connectivity to mobile nodes. The mobile nodes may include cellular telephones, personal data assistants, smart phones, text messaging devices, Global Positioning Systems, navigation systems, network interface cards, notebook computers, desktop computers, and the like. Numerous types and generations of wireless communication systems have been developed and deployed to provide network connectivity to mobile nodes. Exemplary wireless communication systems include systems that provide wireless connectivity to micro cells (e.g., systems that provide wireless connectivity according to the IEEE 802.11, IEEE 802.15, or Wi-Fi standards) and systems that provide wireless connectivity to macro cells (e.g., systems that operate according to the Third Generation Partnership Project standards—3GPP, 3GPP2—and/or systems operate according to the IEEE 802.16 and IEEE 802.20 standards). Multiple generations of these systems have been deployed including Second Generation (2G), Third Generation (3G), and Forth Generation (4G).

The coverage provided by different service providers in a heterogeneous communication system may intersect and/or overlap. For example, a wireless access node for a wireless local area network may provide network connectivity to mobile nodes in a micro cell associated with a coffee shop that is within the macro cell coverage area associated with a base station of a cellular communication system. For another example, cellular telephone coverage from multiple service providers may overlap and mobile nodes may therefore be able to access the wireless communication system using different generations of radio access technologies, e.g., when one service provider implements a 3G system and another service provider implements a 4G system. For yet another example, a single service provider may provide coverage using overlaying radio access technologies, e.g., when the service provider has deployed a 3G system and is in the process of incrementally upgrading to a 4G system.

The proliferation of different communication systems coupled with the desire of users to remain connected at all times has dramatically increased the opportunity and/or potential for handovers between systems that operate according to different radio access technologies. Inter-radio access technology (inter-RAT) handovers typically require make-before-break procedures to facilitate a seamless user experience during the handoff. For example, both legs of the handoff may use a common Internet protocol (IP) anchor point and a common authentication/authorization mechanism in the network to maintain IP session continuity during a handoff from a source access node to a target access node. From the end-user or mobile node perspective, preserving IP session continuity generally means that the end-user maintains the same IP address throughout the inter-technology hand off and registers this IP address with the network (over source and target paths, legs, or links that include source and target access nodes). From the network perspective, IP session continuity supports delivery of uplink data packets from the end-user device and downlink data packets to the end-user device. For example, a network-side forwarding function can be achieved by having the end-user device register the IP session with the IP anchor point over the target access node so that downlink IP packets can be tunneled from the IP anchor point to the target access node.

However, providing IP session continuity solves only half the problem. In order to provide a seamless user experience during the brief but significant handover periods great care must be taken to minimize the effect of the handover on the currently active data streams. If not handled properly, IP session data packets could be lost, duplicated and/or received out of order. While some applications such as web browsing may appear (from the end-user perspective) largely unaffected by data stream interruptions that occur during handoffs, other applications can be affected by even the slightest of interruptions. For example, end users may be acutely aware of any disruptions in high data rate and/or real-time services such as phone calls, live video streaming, Internet gaming, and the like. The disruptions may be experienced as a garbled or interrupted voice, video pixilation and/or freeze, or even dropped TCP connections. These weaknesses and/or drawbacks are likely to become more apparent because the increased network reliability and throughput of modern networks has led to widespread use of IP to deliver applications with real-time requirements and these applications do not tolerate the delay associated with retransmitting dropped packets.

One approach to handing off IP data sessions between source and target access paths is to use data stream switching. No special actions are performed by the mobile node or the network in basic data stream switching. The network simply switches the data path from the source to the target access path as soon as registration of the mobile node (over the target access node) has been accepted. The mobile node switches its data path from the source to the target access path once the mobile node receives and processes the reply from the network indicating that the registration has been accepted. This approach has the advantage of being straightforward to implement but it virtually guarantees that packets will be dropped in both the uplink and downlink directions. For example, uplink packets on the source leg will be dropped beginning when the network switches the data path and continuing until the time that the mobile node switches the data path. Downlink packets that are in-flight on the source leg will be dropped beginning when the mobile node switches the data path to the target leg. Downlink packets on the target leg that arrive at the mobile node before the mobile node has switched the data path to the target leg will also be dropped.

The number of dropped packets can be reduced by using buffering techniques. For example, the IP anchor point can continue to use the source leg for the data path after receiving the mobile node registration while buffering packets received over the target leg. The data path can then be switched to the target leg after a predetermined time interval that is selected to allow time for the in-flight uplink packets to arrive over the source leg. The IP anchor point will also stop transmitting packets over the downlink until the data path is switched to the target leg. However, it may be difficult to determine the appropriate time interval to balance the competing demands for a longer time interval that guarantees that all the in-flight uplink packets have arrived and a shorter time interval that reduces the delay and/or jitter in the downlink packets. Similar buffering techniques (which have similar drawbacks) can be used to allow the mobile node to continue monitoring the source leg while buffering information received over the target leg.

On the downlink, simultaneous binding of the IP session to both the source leg and the target leg can be used to reduce packet loss. The IP anchor point can transmit duplicate packets over the source and target legs to the mobile node. However, delays and/or jitter may cause the duplicate packets to arrive out of order, in which case the mobile node would have to re-order and/or sort the packets so that they can be processed in the correct order. Furthermore, the mobile node and the IP anchor point would need to implement a system for determining how long to maintain the simultaneous binding and when to drop the simultaneous binding. Besides time duration, a node could attempt to synchronize the two streams (i.e. determine that the same packet is being received over both streams). However, synchronizing the streams may not always be possible. For example, the node may not be able to identify the same packet in the different data streams if the data streams are not using well defined protocols or if the protocol contain no mechanism for the ordering of packets.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for data path switching. Embodiments of the method include transmitting, from a node in a communication system during hand off of a mobile node from a source access network to a target access network, a packet including an end marker that indicates that the packet is the last packet to be transmitted during the hand off over a source link between the mobile node and an anchor node via the source access network. Embodiments of the method also include switching, at the node, a transmission data path from the source link to a target link between the mobile node and the anchor node via the target access network following transmission of the packet including the end marker.

In another embodiment, a method is provided for data path switching at an anchor node. Embodiments of the method include transmitting, from an anchor node in a communication system during hand off of a mobile node from a source access network to a target access network, a packet including an end marker that indicates that the packet is the last packet to be transmitted during the hand off using a downlink data path over a source link between the mobile node and an anchor node via the source access network. Embodiments of the method also include switching, at the anchor node, the downlink data path from the source link to a target link between the mobile node and the anchor node via the target access network following transmission of the packet including the end marker.

In yet another embodiment, a method is provided for data path switching at a mobile node. Embodiments of the method include transmitting, from a mobile node in a communication system during hand off of the mobile node from a source access network to a target access network, a packet including an end marker that indicates that the packet is the last packet to be transmitted during the hand off using an uplink data path over a source link between the mobile node and an anchor node via the source access network. Embodiments of the method also include switching, at the mobile node, the uplink data path from the source link to a target link between the mobile node and the anchor node via the target access network following transmission of the packet including the end marker.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
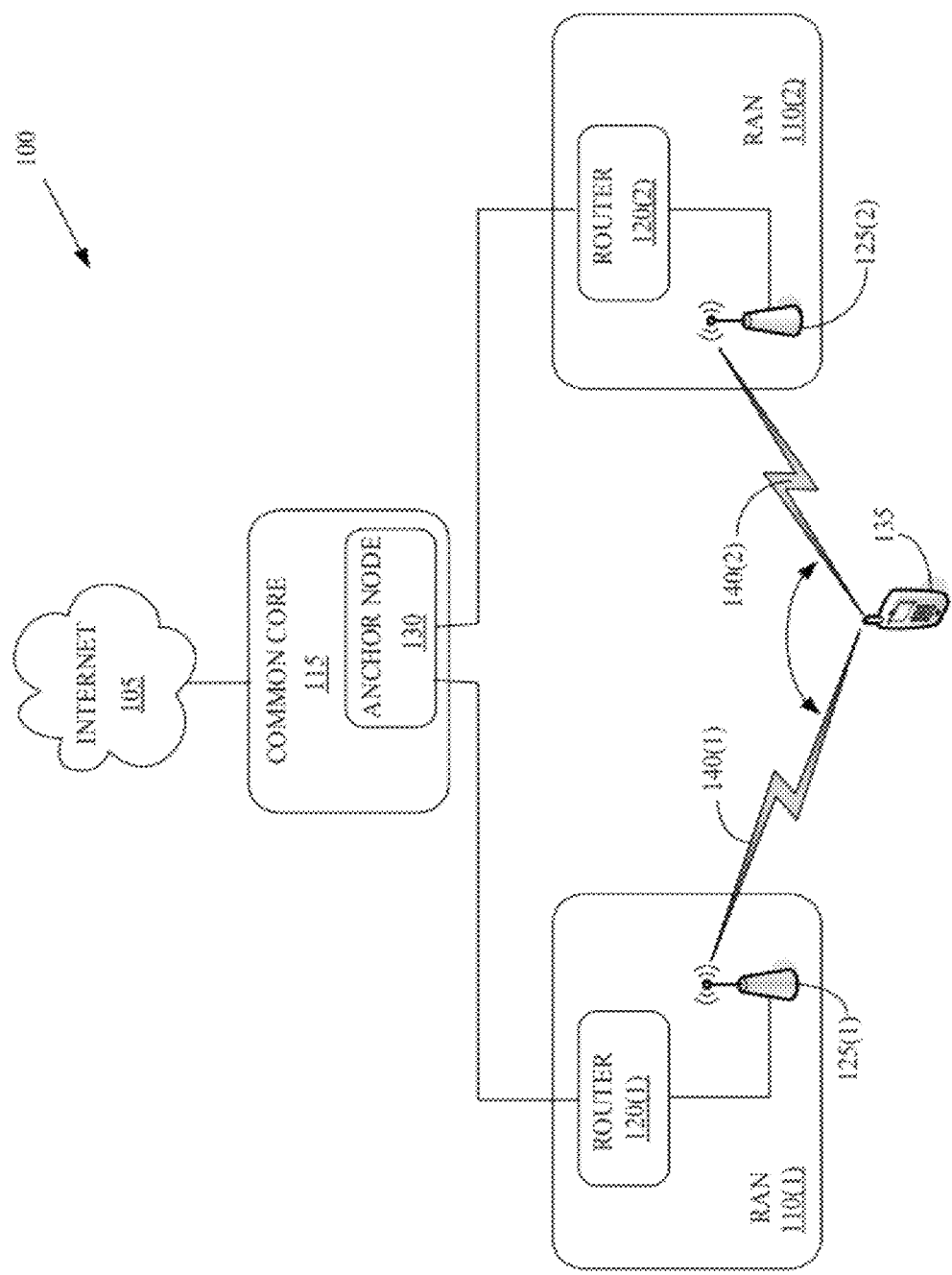
FIG. 1 conceptually illustrates a first exemplary embodiment of a communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes techniques used to facilitate seamless handovers, e.g., by reducing packet loss, delays, and/or jitter associated with data path switching during handovers. Conventional data path switching during IP session handovers virtually guarantees that packets will be dropped in both the uplink and downlink directions. These difficulties in the conventional practice may be exacerbated by the different characteristics of different radio access technologies. Unlike intra-technology handovers, the two legs/links of an inter-technology handover could have very different data path characteristics e.g., the path delay of one link could be significantly shorter than the path delay along the other link. For example, the inventors of the techniques described herein have performed laboratory measurements of round-trip delays in 3G and 4G systems that demonstrate that the improved 4G technology can reduce the round-trip delay (from a mobile node to an anchor point in the network and back) by 50% or more relative to the round-trip delays experienced in 3G systems. The difference in the round-trip delays can lead to increased packet loss. For example, when the source link is slower than the target link, packets can begin arriving over the target link long before all of the in-flight packets have been drained from the source link. These packets will be lost without extensive buffering or duplicate packet transmission over both the source and target links. Transmitting duplicate packets over multiple legs consumes additional scarce air interface resources and requires packet re-ordering functionality on the receiver side. In cases where buffering is incorporated, the different system characteristics make it much more difficult to estimate when to switch the data path from the source to the target at least in part because a larger range (relative to a homogeneous system) of possible round-trip delays may be present in heterogeneous systems. The present application describes embodiments of techniques that may address some or all of these problems by separating the uplink and downlink data paths so that they can be switched independently. End marker packets may be transmitted from one peer to signal to the other peer when to switch the uplink or downlink data path from the source link to the target link.

FIG. 1 conceptually illustrates a first exemplary embodiment of a communication system 100. In the illustrated embodiment, access to the Internet 105 is provided using radio access networks 110(1-2) that are communicatively and/or electronically coupled to the Internet 105 via a common core network 115. Each radio access network 110 shown in FIG. 1 incorporates a router 120 and a base station or eNodeB 125. However, persons of ordinary skill in the art having benefit of the present disclosure should appreciate that the exemplary embodiments of the radio access networks 110 are intended to be illustrative and not to limit the claimed subject matter. Alternative embodiments of the communication system 110 may provide access using different types of wired and/or wireless access points and/or networks. Moreover, in some embodiments, the radio access networks 110 may implement different radio access technologies. For example, the radio access network 110(1) may implement 3G radio access technologies and the radio access network 110(2) may implement 4G radio access technologies.

The common core 115 implements an anchor node 130 such as an Internet protocol (IP) anchor node that serves as a common anchor point for the radio access networks 110 (and possibly other access points). The anchor node 130 maintains information about registered users and can use this information to tunnel and/or forward Internet traffic to the user based on the user's IP address. In various embodiments, the anchor node 130 can be a home agent that implements mobile IP (MIP) or a packet data node gateway in systems that implement Third Generation Partnership Project 3GPP network architectures such as Long Term Evolution (LTE). In various network embodiments that operate according to these protocols, the local access router 120 may be a MIPv4 foreign agent, General Packet Radio Service (GPRS) Tunneling Protocol (GTP) router, a proxy MIP (PMIPv6) client, or other type of routing device.

In the illustrated embodiment, the communication system 100 provides wireless connectivity and network access to one or more mobile nodes 135. In the illustrated embodiment, the mobile node 135 is a dual-mode device that may form wireless communication links according to two different wireless access technologies. For example, the mobile node 135 may be able to operate using either 3G wireless access technologies or 4G wireless access technologies. However, persons of ordinary skill in the art having benefit of the present disclosure should appreciate that the present invention is not limited to mobile nodes 135 that operate according to these two wireless access technologies. In alternative embodiments, the mobile nodes 135 may be dual-mode devices that can operate according to other combinations of wireless access technologies. Furthermore, in some embodiments, the mobile nodes 135 may be multi-mode devices that can operate according to more than two different wired and/or wireless access technologies.

The mobile node 135 may establish a wireless connection or link 140(1) to the base station 125(1) in the radio access network 110(1). The wireless link 140(1) can support uplink and downlink communications, e.g., using one or more uplink and/or downlink channels that can be defined using timeslots, frequencies, channel code, and the like. The radio access network 110(1) and/or the mobile node 135 may monitor channel conditions associated with the wireless communication link 140(1). If the channel conditions of the wireless communication link 140(1) degrade, the network 110(1) and/or the mobile node 135 may initiate a handover, e.g., to the radio access network 110(2), which may operate according to a different wireless access technology. For example, handovers may be initiated by comparing parameters such as a pilot signal strength, a signal-to-noise ratio, a signal-to-noise-plus-interference ratio, a bit error rate, and the like to an appropriate threshold to determine when the channel conditions have degraded to the point that a handover to a different wireless access technology is desirable and/or necessary. The handoff may also be triggered based on preconfigured application-based policy preferences and/or preconfigured user preferences. Alternatively, the handoff may be triggered to support load balancing, quality of service requirements, and the like.

When a handover has been initiated, the mobile node 135 may establish a second wireless communication link 140(2)

with the radio access network 110(2). For example, when the radio access networks 110 operate according to different radio access technologies, the mobile node 135 may establish the second wireless communication link 140(2) according to the second wireless access technology in preparation for an inter-technology handover. Once the decision to handover has been made and the second wireless communication link 140(2) has been established, the anchor node 130 and the mobile node 135 decide when to switch data pathways from the data path that travels through the radio access network 110(1) to the data path that travels through the radio access network 110(2). The data path that includes the radio access network 110(1) may be referred to as the source path, leg, or link. The data path that includes the radio access network 110(2) may be referred to as the target path, leg, or link. Embodiments of the techniques described herein allow the uplink and downlink data paths to be switched independently.

For example, in one embodiment, upon making the decision to handover, the mobile node 135 can send a registration message over the target link 140(2) requesting independent uplink and downlink data path switching with end marker signaling. The mobile node 135 may begin buffering downlink traffic on the target link 140(2) before, after, and/or concurrently with transmission of the registration request. At this point, the mobile node 135 may continue to send and receive traffic on the source link 140(1). When the anchor node 130 in the common core network 115 receives and accepts the registration, the anchor node 130 may switch the downlink path to the target link 140(2) and the anchor node 130 may also send an end marker message over the source link 140(1) to mark the last packet to be sent by the network over the source link 140(1). In alternative embodiments, other criteria may be used to trigger transmission of the end marker message in response to receiving and processing the registration. For example, the anchor node 130 may delay the switch of the downlink path of a voice communication session to the target link 140(2) until the anchor node 130 (or other entity on the network side) detects silence or a pause in the voice transmission. Delaying the switch until the silence/pause may further minimize delay and/or jitter. In various embodiments, the downlink end marker message may be in one or more dedicated packets, included in the last data packet, or be transmitted in other formats. Additionally, the anchor node 130 may begin buffering uplink traffic on the target link 140(2) before, after, and/or concurrently with transmission of the registration reply.

When the mobile node 135 receives and successfully processes the registration reply it switches the uplink to the target link 140(2) and sends an end marker message over the source link 140(1) to mark the last packet to be sent by the mobile node over the source link 140(1). In alternative embodiments, other criteria may be used to trigger transmission of the end marker message in response to receiving and processing the registration reply. For example, the mobile node 135 may delay the switch of the uplink path of a voice communication session to the target link 140(2) until the mobile node 135 detects silence or a pause in the voice transmission. Delaying the switch until the silence/pause may further minimize delay and/or jitter. In various embodiments, the uplink end marker message may be in one or more dedicated packets, included in the last data packet, or be transmitted in other formats. The anchor node 130 may switch its uplink path to the target link 140(2) after receiving the end marker packet on the source link 140(1) from the mobile node 135, at which point the anchor node 130 may concurrently release any uplink buffered packets on the target link 140(2). Similarly, the mobile node 135 may switch its downlink path to the target link 140(2) after receiving the end marker packet on the source link 140(1) from the anchor node 130, at which point the mobile node 135 may concurrently release any downlink buffered packets on the target link 140(2).

Figure 2:
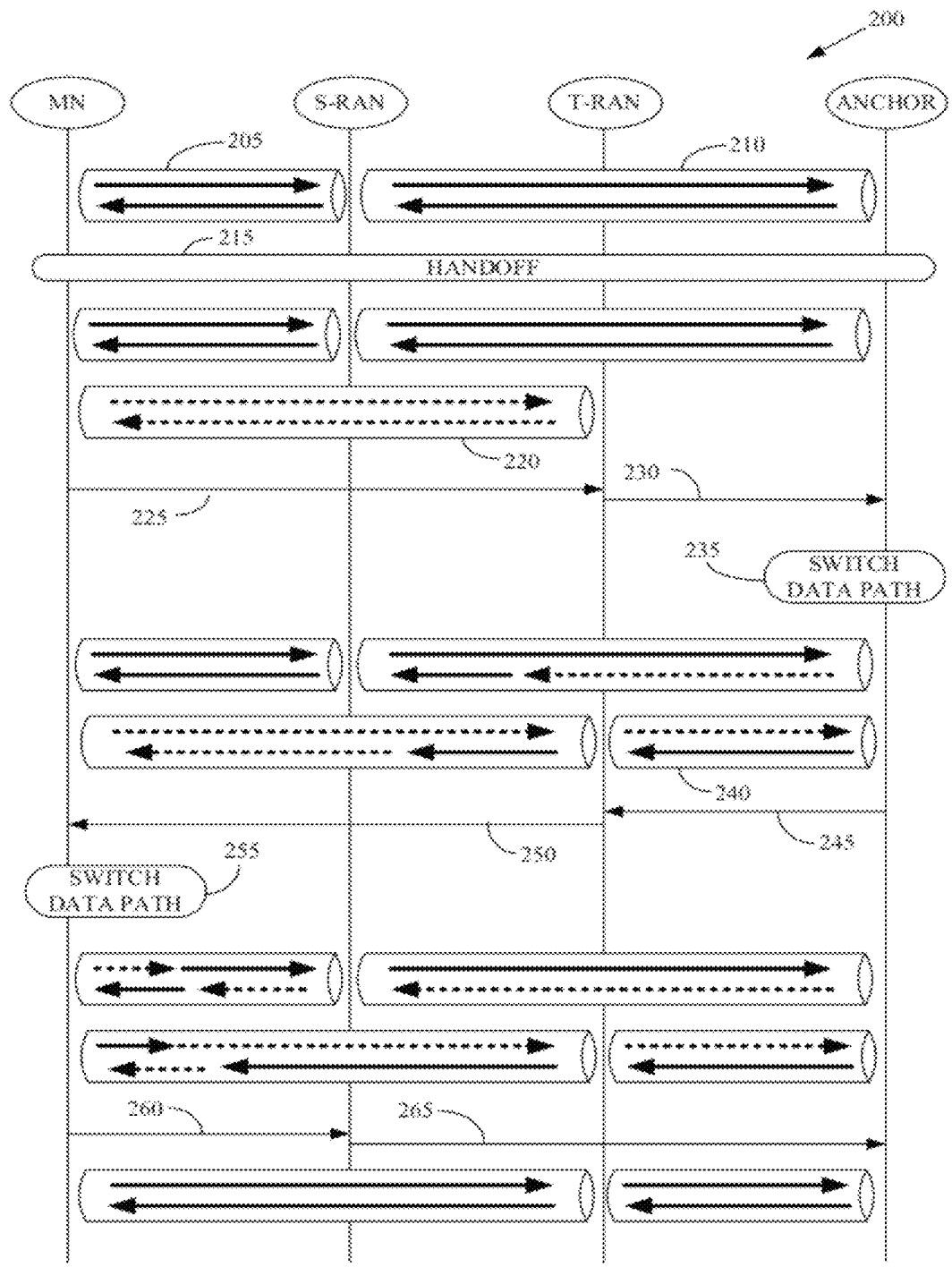
FIG. 2 conceptually illustrates a first exemplary embodiment of a data path switching technique.

FIG. 2 conceptually illustrates a first exemplary embodiment of a data path switching technique 200. In the illustrated embodiment, a mobile node (MN) has established a wireless communication link (or source link) that includes a portion 205 that connects the mobile node with a source radio access network (S-RAN). The source link 205 includes a source uplink and a source downlink indicated by the directional arrows. Herein, the term "link" refers collectively to the uplink and the corresponding downlink. The term "downlink" is used to refer exclusively to the downward or forward side of a link, e.g. to the "source downlink." Analogously, the term "uplink" is used to refer exclusively to the upward or reverse side of a link, e.g. to the "source uplink.". At this point in the procedure, the arrows are drawn using solid lines to indicate that packets are being actively transmitted. The same convention is used throughout the figures. The source link 205 includes a portion 210 that couples the source radio access network to an anchor node (ANCHOR). A portion 210 also includes an uplink and a downlink indicated by solid directional arrows to indicate that the uplink and downlink are actively transmitting packets. Initially, the mobile node and the network are actively receiving and processing packets transmitted over the source link 205, 210. The decision to hand off the mobile node from the source radio access network to a target radio access network (T-RAN) is made at the time indicated by the box 215.

The mobile node and the target radio access network establish a portion 220 of a target wireless communication link in preparation for data path switching. In the illustrated embodiment, the portion 220 is a level-2 (L2) connection between the mobile node and the target radio access network. The L2 connection may also be referred to as a data link layer connection such as defined by the Open Systems Interconnect (OSI) model. The target link 220 includes an uplink and a downlink that are indicated by directional arrows. In the illustrated embodiment, the uplink and downlink indicated by the directional arrows are used to transmit data packets while control path packets may be transmitted over the target link. The uplink and downlink are not yet being used to actively transmit packets. In the figure, the arrows are drawn using dashed lines to indicate that the corresponding uplink and downlink are not actively transmitting packets. The same convention is used throughout the figures. The mobile node transmits (at 225) a registration request to the target radio access network, which forwards (at 230) the registration request to the anchor node. The anchor node accepts the registration request and switches (at 235) the data path from the source link 205, 210 to the target link, which includes portion 220 and an additional portion 240 between the anchor node and the target radio access network.

At this point, the mobile node is using the source link 205, 210 to receive and transmit packets while the anchor node is using the target link 220, 240 to receive and transmit packets. The source uplink 205, 210 is therefore shown as a solid arrow to indicate that packets are still being actively transmitted along the uplink. However, these packets may be dropped since the anchor node is no longer receiving packets on the source link 205, 210. The anchor node is also no longer transmitting packets along the source downlink 205, 210 so a portion of the downlink (indicated by a dashed arrow) no longer contains packets associated with this session between the mobile node and the anchor node. The anchor node has begun to transmit packets on the target downlink 220, 240 and so portion of the target downlink is actively being used to transmit packets (indicated by the solid arrow). The mobile node is not actively using the target uplink 220, 240 (as indicated by the dashed arrow).

The anchor node may transmit (at 245) a registration reply to the target radio access network. In various embodiments, the registration reply can be sent before, after, and/or concurrently with switching the data paths. The target radio access network may then forward (at 250) the registration reply to the mobile node. In one embodiment, control messages such as the registration reply may be transmitted over the same connection as the data packets. Upon receipt and processing of the registration reply, the mobile node can switch (at 255) data paths to the target link 220, 240. The mobile node may therefore stop transmitting packets along the source uplink (as indicated by the dashed arrow) and begin transmitting packets along the target uplink (as indicated by the solid arrow). The mobile node may drop packets that remain in the source downlink and may begin receiving downlink packets on the target downlink. Additionally, the mobile node may drop target downlink 220, 240 packets that arrive prior to the receipt (and processing) of the registration reply and before the actual switching of the source downlink 205, 210 to the target downlink 220, 240. The portion 205 of the source link can then be torn down (at 260) and the portion 210 of the source link can be torn down (at 265). From this point on the mobile node and the anchor node can actively transmit and receive packets along the target uplink and downlink 220, 240.

Figure 3A:
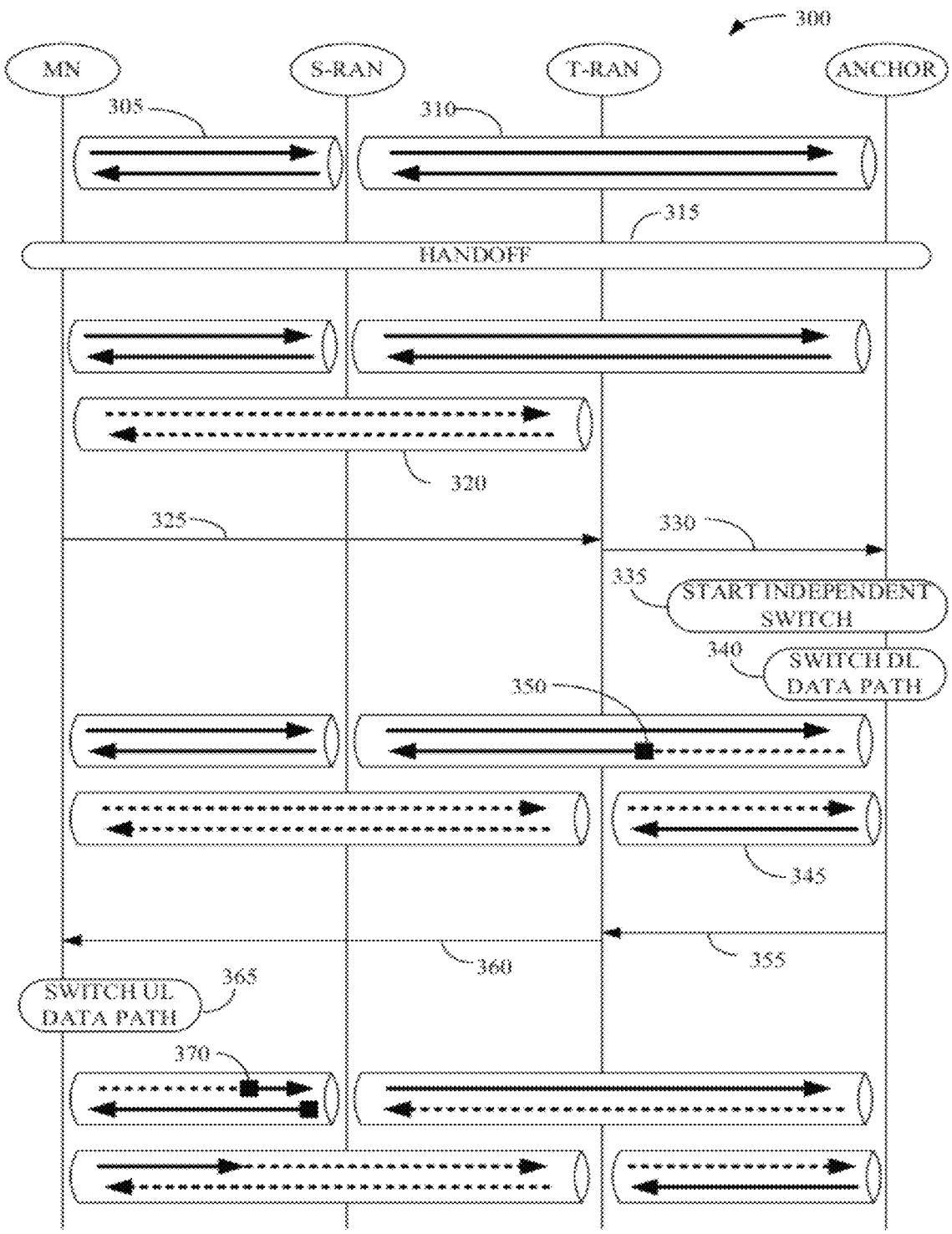
FIG. 3A conceptually illustrates a second exemplary embodiment of a data path switching technique.

FIG. 3A conceptually illustrates a second exemplary embodiment of a data path switching technique 300. In the illustrated embodiment, a mobile node (MN) has established a wireless communication link (or source link) that includes a portion 305 that connects the mobile node with a source radio access network (S-RAN). The source link 305 includes an uplink and a downlink indicated by the directional arrows, which are solid at this point in the figure to indicate that the uplink and downlink are actively transmitting packets. The source link 305 includes a portion 310 that couples the source radio access network to an anchor node (ANCHOR). The portion 310 also includes an uplink and a downlink indicated by solid directional arrows to indicate that the uplink and downlink are actively transmitting packets. Initially, the mobile node and the network are actively receiving and processing packets transmitted over the source link 305, 310. The decision to hand off the mobile node from the source radio access network to a target radio access network (T-RAN) is made at the time indicated by the box 315. In different embodiments, the decision to hand off can be made by the mobile unit and/or the network based upon measurements of uplink and/or downlink channel qualities or other criteria.

In the illustrated embodiment, the mobile node and the target radio access network respond to the handoff decision by establishing a portion 320 of a target wireless communication link in preparation for data path switching. In the illustrated embodiment, the portion 320 is a level-2 (L2) connection between the mobile node and the target radio access network. The target link 320 includes an uplink and a downlink that are indicated by the directional arrows. The uplink and downlink are not yet being used to actively transmit packets and so they are shown as dashed arrows. In the illustrated embodiment, the uplink and downlink indicated by the directional arrows are used to transmit data packets while control path packets may be transmitted over the target link. The mobile node transmits (at 325) a registration request message that includes information indicating that the mobile unit is configured to support independent uplink and downlink data path switching. In one embodiment, the registration request message also includes information requesting that independent uplink and downlink data path switching with end marker signaling be used by the mobile unit and the anchor node with the end marker used to indicate the last packet sent on the uplink and/or downlink.

The mobile node may begin monitoring the source downlink for the end marker indicating the last data packet 350 to be transmitted over the source downlink. Monitoring may begin before, after, and/or concurrently with transmitting (at 325) the registration message so that the mobile node can detect an end marker message received over the source downlink even if the source path delay is shorter than the target path delay, in which case an end marker message could be received before receiving a registration reply from the anchor node. The mobile node may also start buffering downlink traffic on the target link to capture downlink packets that arrive on the target link before an end marker message arrives on the source link, e.g., when the target path delay is shorter than the source path delay. In one embodiment, buffering is initiated in conjunction with transmitting (at 325) the registration message so that the buffering begins before downlink packets are received over the target link in response to the registration message. Buffering may therefore begin before, after, or concurrently with transmission (at 325) of the registration message.

The registration request message is received by the target radio access network and forwarded to the anchor node (at 330). When the anchor node receives a registration request message that includes a request for independent uplink and downlink data path switching with end marker signaling, the anchor node may switch (at 335) to an operating mode that utilizes independent uplink and downlink data path switching with end marker signaling. In this mode, the anchor node can independently change the uplink and downlink data paths from the source link 305, 310 to the portion 320 of the target link.

In the illustrated embodiment, the anchor node switches (at 340) the downlink data path from the source link 305, 310 to the target link including the portion 320 and a portion 345 established between the anchor node and the target radio access network. The anchor node also generates an end marker that the anchor node transmits over the source downlink. In one embodiment, the end marker may itself be the last packet, e.g. when the end marker message (EMM) implemented in a MIP system contains the end marker). Alternatively, end marker information may be attached to a packet to indicate that it is the last packet. Once the last packet 350 has been transmitted, the anchor node does not transmit any additional packets on the source downlink, as indicated by the dashed line following the last packet and/or end marker 350. The anchor node may then begin transmitting data packets over the target downlink, as indicated by the solid arrow in the portion 345. At this point, the anchor node is still receiving uplink packets over the source uplink and the mobile node is actively transmitting packets over the source uplink and receiving packets over the source downlink. In one embodiment, the anchor node may also begin buffering uplink packets received over the target uplink.

The anchor node transmits (at 355) a registration reply to the target radio access network, which forwards (at 360) the registration reply to the mobile node. In the illustrated embodiment, the registration reply includes a confirmation that the anchor node is using independent uplink and downlink data path switching with end marker signaling. In one embodiment, buffering is initiated at the anchor node in conjunction with transmitting (at 355) the registration reply so that the buffering begins before uplink packets are received over the target link in response to the registration reply. Buffering may therefore begin before, after, or concurrently with transmission (at 355) of the registration reply. The anchor node may use this buffering to capture uplink packets received over the target uplink that arrive before an end marker has been received over the source uplink, e.g., when delays on the target link are substantially shorter than delays on the source link. Upon receipt of the registration reply, the mobile node becomes aware that the requested independent uplink and downlink data path switching with end marker signaling is being used. The mobile node switches (at 365) the uplink data path from the source uplink to the target uplink, but continues to maintain the downlink data path via the source downlink. The mobile node would also transmit an end marker 370 that indicates that the packet including the end marker 370 is the last packet that the mobile node is going to transmit on the source uplink. Following the end marker 370, the mobile node does not actively transmit packets on the source uplink, as indicated by the dashed line.

In the illustrated embodiment, at this point in the process the end markers 350, 370 may be concurrently in flight, the network has switched the downlink data path to the target link while maintaining the uplink data path via the source link, and the mobile node has switched the uplink data path to the target link while maintaining the downlink data path via the source link. However, persons of ordinary skill in the art having benefit of the present disclosure should appreciate that this particular sequence of events and state of the system is intended to be illustrative and not to limit the claimed subject matter. In alternative embodiments and in other contexts, the particular sequence of events and/or state of the system may vary depending on such factors as the time delays in the uplink and/or downlink data paths, processing time within the mobile node, the radio access networks, and/or the anchor node, and the like.

Figure 3B:
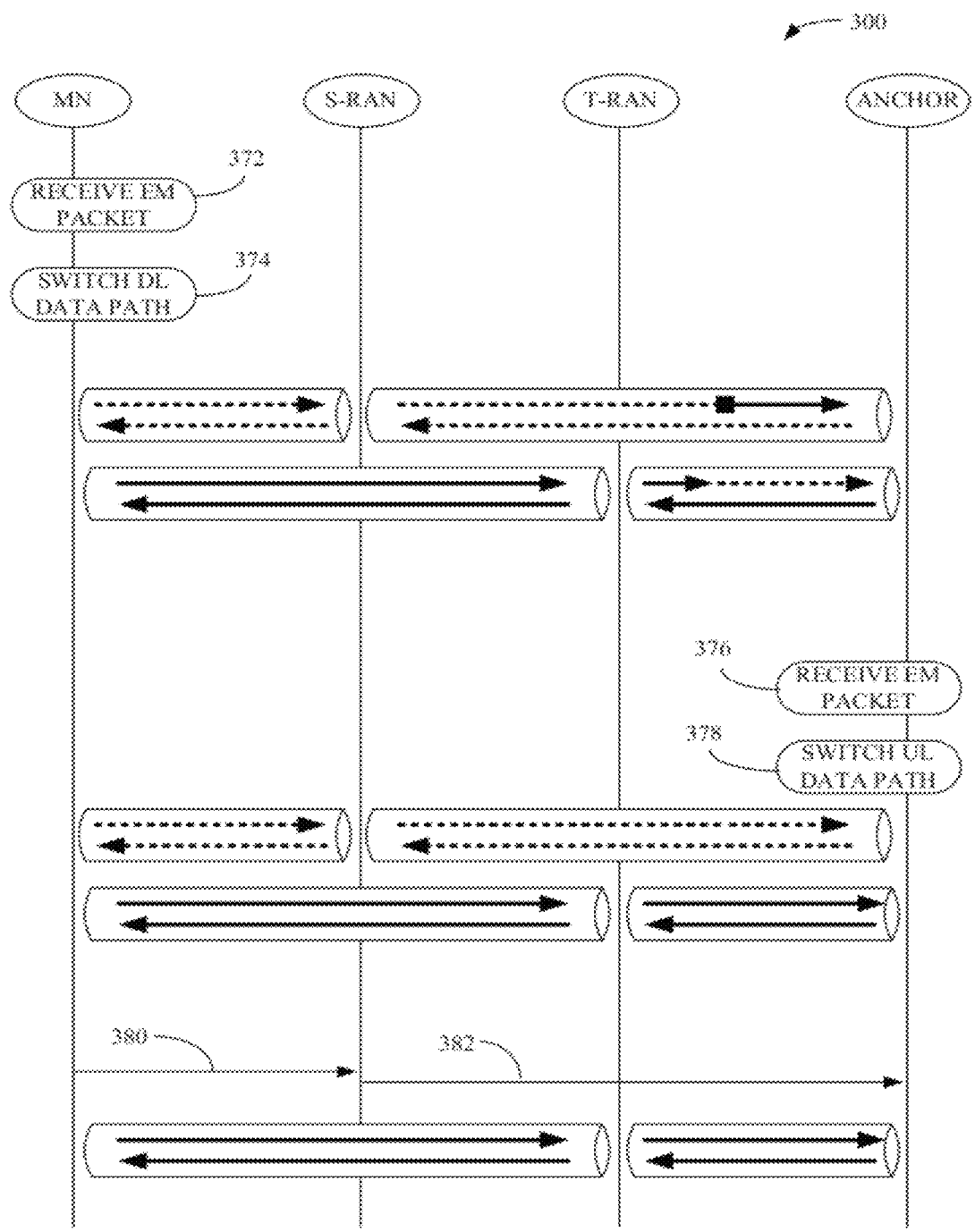
FIG. 3B conceptually illustrates additional events in the second exemplary embodiment of the data path switching technique.

FIG. 3B conceptually illustrates additional events in the second exemplary embodiment of the data path switching technique 300. In the illustrated embodiment, the mobile node receives (at 372) the end marker packet 350 indicating that the received packet is the last packet transmitted from the anchor node over the source downlink. In response to receiving the end marker packet 350, the mobile node begins processing any buffered packets that were received over the target downlink and concurrently switches (at 374) the downlink data path to the target downlink. At this point, the source downlink is not actively used to receive packets, as indicated by the dashed arrows. In the illustrated embodiment, the end marker packet 370 remains in flight over the source uplink and so the anchor node maintains the uplink data path via the source link.

The anchor node receives (at 376) the uplink end marker packet 370 that indicates that this is the last packet that the mobile node transmitted over the source uplink. In response to receiving the end marker packet 370, the anchor node may process any target uplink packets that were buffered and concurrently switch (at 378) the uplink data path to the target uplink. At this point, the source uplink has been drained of packets associated with the session and neither the source uplink nor the source downlink is being used to actively transmit packets between the mobile node and the anchor node. In the illustrated embodiment, the mobile node then transmits (at 380) a request to tear down the source uplink, which the source radio access network receives and forwards (at 382) to the anchor node. The source link 305, 310 can then be torn down. At this point, the handover has completed and the mobile node and the anchor node are communicating using the uplink and downlink data paths over the target link 320, 345. Persons of ordinary skill in the art having benefit of the present disclosure should appreciate that the particular sequence of events shown in FIG. 3B is intended to be illustrative and not to limit the claimed subject matter. In alternative embodiments and/or contexts, the sequence of events may differ from the sequence depicted in FIG. 3B.

Figure 4:
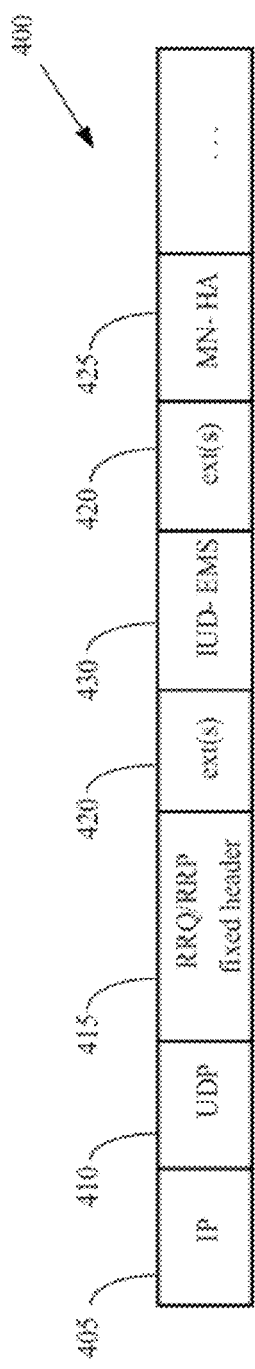
FIG. 4 conceptually illustrates one exemplary embodiment of a registration request message that can be used to request independent data path switching and end marker signaling.

FIG. 4 conceptually illustrates one exemplary embodiment of a registration message 400 that can be used to request independent uplink and downlink data path switching with end marker signaling. The registration message 400 can be used for a registration request (RRQ) and as a registration reply (RRP) for the registration. In one embodiment, the registration message 400 can also be used for deregistration. The difference between the registration and deregistration is that the latter is a registration request with a lifetime of zero. In the illustrated embodiment, the registration request message 400 includes an IP header 405, a UDP header 410, and a fixed request/reply (RRQ/RRP) header 415. The header fields 405, 410, 415 may be followed by one or more optional extension headers 420 and an authorization-enabling extension 425. Information that precedes the authorization-enabling extension 425 in the message 400 is (at a minimum) integrity and data origin protected using key information that can be used to verify, authorize, and/or authenticate the message. For example, the authorization-enabling extension 425 may be an extension that is formed by hashing the fields 405, 410, 415, 420 using a secret key known to the mobile node and the home agent (or another network authorization/authentication entity that is in communication with the home agent). In one embodiment, verification may ensure that the packet 400 wasn't modified and that it came from the peer.

The registration request message 400 also includes an Independent Uplink and Downlink with End Marker Signaling extension header (IUD-EMS) 430 that may be used in conjunction with MIP registration messages. In the illustrated embodiment, the header 430 is inserted before the MN-HA authorization-enabling extension 425 so that this information can be authenticated/authorized using the same mechanism that is used to authenticate/authorize the other fields in the message 400. In one embodiment, the extension 430 may be an extension type that is optional or skippable (i.e. value>128) so that the message 400 can be used by nodes that do not support independent uplink and downlink data path switching with end marker signaling. The presence or value of the extension 430 in the registration request message 400 can be used to indicate MN support and requests HA support for independent uplink and downlink data path switching with end marker signaling. The presence or value of the extension 430 in the registration reply message 400 can be used to indicate HA ability and willingness to support independent uplink and downlink data path switching with end marker signaling. Embodiments of the message 400 may therefore be used in a backwards compatible manner with nodes that do not support independent uplink and downlink data path switching with end marker signaling.

Inserting the extension 430 before the authorization-enabling extension may allow the contents of the extension 430 to be protected. Moreover, the peer has assurance that the extension 430 was added by the remote peer. Using a skippable/optional extension type allows a network entity that does not implement this capability to safely ignore the contents of the extension 430 while continuing to process the rest of the message (i.e., the approach is backwards compatible). Including the extension 430 in the message 400 allows a peer to indicate its ability and/or willingness to support this capability. In one embodiment, the extension 430 includes a session identifier that identifies the MIP session that is being handed off. For example, the session identifier may be randomly generated by the mobile node at the time of initial registration and returned in the RRP by the network if the capability is supported and accepted. Subsequent registrations may include this same session identifier. The extension 430 may also include a hint that suggests how long each peer should wait for the end marker message before switching the data path from the source to the target. For example, the hint may indicate the path delay of the source link, which can be determined or estimated to be approximately ½ the measured roundtrip delay for the last registration. The hint may be used to provide a reasonable estimate of a timeout interval for the case where the end marker message is lost.

Figure 5:
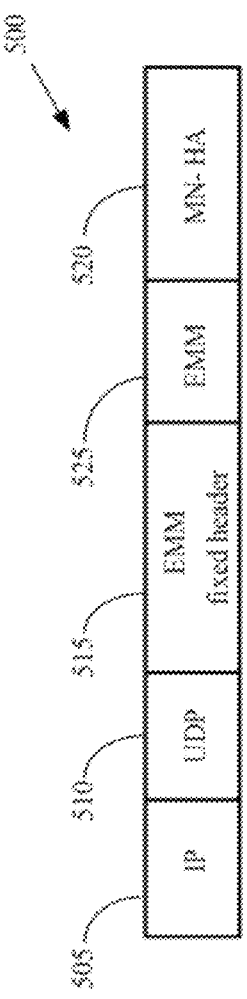
FIG. 5 conceptually illustrates one exemplary embodiment of an end marker message (EMM) that can be used to indicate the last packet transmitted over the uplink and/or downlink of the source link.

FIG. 5 conceptually illustrates one exemplary embodiment of an end marker message (EMM) 500 that can be used to indicate the last packet transmitted over the source uplink and/or downlink. In the illustrated embodiment, the end marker 500 may be used by the network and mobile node to mark the last message transmitted on the source link before switching the downlink or uplink to the target link, respectively. The end marker 500 includes an IP header 505, a UDP header 510, and a fixed EMM header 515. The header fields 505, 510, 515 may be followed by an authorization-enabling extension 520. Information that precedes the authorization-enabling extension 520 in the message 500 is (at a minimum) integrity and data origin protected using key information that can be used to authorize and/or authenticate the message. For example, the authorization-enabling extension 520 may be an extension that is formed by hashing the fields 505, 510, 515 using a secret key known to the mobile node and the home agent (or another network authorization and/or authentication entity that is in communication with the home agent).

The end marker message 500 also includes an end marker (EMM) 525. In the illustrated embodiment, the end marker 525 may include a session identifier associated with the current session, such as the session identifier as identified during the initial registration. The end marker 525 may also include a sequence number that has a value greater than the last transmitted end marker (initially 0) and an indicator that says whether the end marker 525 should be applied to the uplink or downlink, e.g. the indicator may have a value of 1 for the uplink, 0 for the downlink.

In the illustrated embodiment, the end marker message 500 provides data integrity and data origin authentication to help protect against denial of service (DoS) attacks such as reflection, replay, and spoofing. For example, the MIP framework can be leveraged to create the End Marker Message (EMM) MIP message 500. The MIP message 500 may contain an end marker extension 525 that may be protected by an authorization-enabling extension (e.g. similar to RRQ/RRP messages depicted in FIG. 4). Inserting the extension 525 before the authorization-enabling extension 520 allows the contents of the extension 525 to be protected and provides the peer with assurance that the extension 525 has not been modified (data integrity). The peer can also verify that the extension 525 was generated by the remote peer (data origin authentication). Once the message has been verified, the information in the end marker message may be used to determine whether to switch the data path. For example, session ID and/or sequence number could be used to identify old or replay messages while the direction indicator could detect reflected messages (e.g., the indicator indicates a downlink packet but the packet was received on the uplink), in such cases the end marker would not be accepted and the data path may not be switched. Thus, the data in the message can be used to determine if a data path switch should be performed but only after having verified the message is valid, e.g., when the packet was successfully authenticated and/or authorized.

Embodiments of these techniques can be extended to other mobility algorithms such as PMIP, GTP (GPRS Tunneling protocol), etc. by allowing the mobile node to forward the information needed for the IUD-EMS extension to the appropriate party and to receive the corresponding response. In the case of PMIP, changes may be made to DHCP such that the mobile node can supply the information needed for the IUD-EMS extension and for the mobile node to receive the corresponding response. For example, when the mobile node requests an IP address through Dynamic Host Control Protocol (DHCP) signaling or messaging, it may include an option that allows it to pass the session identifier and timeout hint to the PMIP client so that it can be placed into the IUD-EMS extension. Similarly, a DHCP option may be used for passing the home agent's response to the mobile node. For example, the DHCP option may support transmitting information indicating the home agent's acceptance/rejection of the request along with the HA's IP address. The latter may allow the end marker message to be sent to the IP anchor point (HA) when only PMIP is being used on both the source and target links.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
transmitting a packet from an anchor node in a communication system during hand off of a mobile node from a source access network to a target access network, wherein the packet includes a downlink end marker indicating that the packet is the last packet to be transmitted during the hand off, and wherein the downlink end marker is transmitted prior to receiving an uplink end marker, and wherein the packet is transmitted over a source link between the mobile node and the anchor node via the source access network; and
at the anchor node, switching a transmission data path from the source link to a target link between the mobile node and the anchor node via the target access network independently of switching a reception data path from the source link to the target link.

2. The method of claim 1, wherein transmitting the packet including the downlink end marker comprises transmitting a packet including a downlink end marker that comprises an identifier of a session being handed off, a sequence number associated with the session, and an uplink/downlink indicator.

3. The method of claim 2, wherein transmitting the packet including the downlink end marker comprises transmitting a packet including a downlink end marker that is protected using a secret key for authorization and authentication of the end marker.

4. The method of claim 1, comprising buffering, at the anchor node, packets received over the target link, wherein said buffering is initiated in conjunction with transmitting a registration message from the anchor node so that said buffering begins before packets are received over the target link in response to the registration message.

5. The method of claim 4, comprising receiving, at the anchor node, a packet including the uplink end marker indicating that the packet is the last packet to be received over the source link.

6. The method of claim 5, comprising:
switching the reception data path from the source link to the target link independently of said switching of the transmission data path from the source link to the target link; and
processing any buffered packet concurrently with switching the reception data path, wherein said switching and said processing are performed in response to receiving the packet including the uplink end marker indicating that the packet is the last packet to be received over the source link.

7. The method of claim 6, wherein receiving the packet including the uplink end marker comprises receiving a packet including an uplink end marker comprising an identifier of a session being handed off, a sequence number associated with the session, and an uplink/downlink indicator, and wherein the uplink end marker is protected using a secret key for authorization and authentication of the uplink end marker.

8. The method of claim 7, comprising verifying, authorizing, and/or authenticating the packet including the uplink end marker using the secret key prior to switching the reception data path from the source link to the target link.

9. A method, comprising:
transmitting a packet from an anchor node in a communication system during hand off of a mobile node from a source access network to a target access network, wherein the packet includes a downlink end marker indicating that the packet is the last packet to be transmitted during the hand off, and wherein the downlink end marker is transmitted prior to receiving an uplink end marker, and wherein said packet is transmitted using a downlink data path over a source link between the mobile node and the anchor node via the source access network; and
at the anchor node, switching the downlink data path from the source link to a target link between the mobile node and the anchor node via the target access network, wherein said switching is performed independently of switching an uplink data path from the source link to the target link and concurrently with said transmission of the packet including the downlink end marker.

10. The method of claim 9, wherein transmitting the packet comprising the downlink end marker comprises transmitting the packet comprising the downlink end marker in response to receiving, from the mobile node, a handoff registration message requesting that the downlink data path be switched independently of an uplink data path using end marker signaling.

11. The method of claim 10, comprising buffering, at the anchor node, packets received on the uplink data path over the target link in conjunction with transmission of a registration reply message in response to the handoff registration message so that said buffering begins before uplink packets are received over the target link in response to the registration reply message.

12. The method of claim 11, comprising:
receiving, at the anchor node on the uplink data path over the source link, a packet including the uplink end marker indicating that the packet is the last uplink packet to be received over the source link during the hand off;
switching, at the anchor node, the uplink data path from the source link to the target link independently of said switching of the downlink data path from the source link to the target link; and
processing any buffered packets in response to receiving the packet that comprises said end marker.

13. The method of claim 12, comprising verifying integrity and origin of the packet using information in the uplink end marker prior to switching the uplink data path from the source link to the target link.

14. The method of claim 9, wherein transmitting the packet that includes the uplink end marker comprises transmitting, in the packet, information that verifies the packet to the mobile node.

15. A method, comprising:
transmitting a packet from a mobile node in a communication system during hand off of the mobile node from a source access network to a target access network, wherein the packet comprises an uplink end marker indicating that the packet is the last packet to be transmitted, and wherein the packet is transmitted using an uplink data path over a source link between the mobile node and an anchor node via the source access network, and wherein the uplink end marker is transmitted prior to receiving a downlink end marker; and
at the mobile node, switching the uplink data path from the source link to a target link between the mobile node and the anchor node via the target access network independently of switching a downlink data path from the source link to the target link.

16. The method of claim 15, wherein transmitting the packet that includes the uplink end marker comprises transmitting a packet comprising information that verifies integrity and origin of the uplink end-marker-including packet to the anchor node.

17. The method of claim 15, wherein transmitting the packet comprising the uplink end marker comprises transmitting the packet comprising the uplink end marker in response to receiving, from the anchor node, a registration reply confirming receipt of a handoff registration message requesting that the downlink data path be switched independently of the uplink data path using end marker signaling.

18. The method of claim 17 comprising buffering, at the mobile node, packets received on the downlink data path over the target link concurrently with transmission of the handoff registration message so that said buffering begins before downlink packets are received over the target link in response to the handoff registration message.

19. The method of claim 18, comprising:
receiving, at the mobile node on the downlink data path over the source link, a packet comprising the downlink end marker indicating that the packet is the last downlink packet to be received over the source link;
switching the downlink data path from the source link to the target link independently of said switching of the uplink data path from the source link to the target link; and
processing buffered packets in response to receiving said packet.

20. The method of claim 19, comprising verifying integrity and origin of the packet using information in the downlink end marker prior to switching the downlink data path from the source link to the target link.

* * * * *